(12) United States Patent
Thottappilly et al.

(10) Patent No.: US 12,141,892 B1
(45) Date of Patent: Nov. 12, 2024

(54) DISTRIBUTED GEOMETRY PROCESSING AND TRACKING CLOSED PAGES

(71) Applicant: Apple Inc., Cupertino, CA (US)

(72) Inventors: Arjun Thottappilly, Oviedo, FL (US); Frank W. Liljeros, Sanford, FL (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 17/805,607

(22) Filed: Jun. 6, 2022

(51) Int. Cl.
*G06F 12/02* (2006.01)
*G06T 1/60* (2006.01)

(52) U.S. Cl.
CPC ..................... *G06T 1/60* (2013.01)

(58) Field of Classification Search
CPC ........................................ G06T 1/60
USPC ....................................... 345/543
See application file for complete search history.

(56) References Cited

U.S. PATENT DOCUMENTS

| 2015/0109314 A1* | 4/2015 | Redshaw | G06T 15/005 345/543 |
| 2020/0409576 A1* | 12/2020 | Bahirji | G06F 3/0653 |
| 2021/0158584 A1 | 5/2021 | Chalfin et al. | |
| 2021/0272349 A1* | 9/2021 | Schluessler | G06T 11/40 |
| 2022/0050790 A1* | 2/2022 | Goodman | G06F 12/109 |

OTHER PUBLICATIONS

US 11,127,187 B2, 09/2021, Bratt et al. (withdrawn)

\* cited by examiner

*Primary Examiner* — Gordon G Liu
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to handling memory pages for geometry processing in graphics processors. In some embodiments, a set of geometry work includes multiple segments that generate primitive data. The graphics processor may use distributed control circuitry to assign memory pages, from a page pool for a memory, for primitive data from the geometry work and may close memory pages completed by the geometry work. The distributed control circuitry may generate a list of closed pages for a given segment of the set of geometry work. Primary control circuitry may combine multiple lists of closed pages, from the distributed control circuitry, to generate a consolidated list of closed pages for the set of geometry work. This may reduce memory footprint and facilitate traversal of the combined list, in some embodiments.

20 Claims, 10 Drawing Sheets

*LLCP Header*

| LLCP link 410 | Valid 415 | Count of entries in page 420 |
|---|---|---|

LLCP Section (up to N sections in a page, along with the header)

| Valid 425 | Page identifier(s) 430 |
|---|---|

*LLCP Segment Base Allocation*

| Valid 435 | LLCP last-linked-count 440 | LLCP last-linked-page 445 | Valid 450 | LLCP first-linked-page 455 |
|---|---|---|---|---|

*FIG. 4*

DISTRIBUTED GEOMETRY PROCESSING AND TRACKING CLOSED PAGES

BACKGROUND

Technical Field

This disclosure relates generally to graphics processors and more particularly to tracking closed pages for distributed geometry processing.

Description of the Related Art

Graphics processors perform various operations as part of rendering a frame of graphics data. For example, the process typically includes geometry processing that generates primitive data (e.g., primitive blocks) and control stream information. Fragment processing may consume this data for rasterization to generate fragment data. Pixel shaders may operate on the fragment data to generate the frame.

As graphics processors become more powerful and distributed, managing data produced by geometry processing may be challenging.

BRIEF DESCRIPTION OF THE DRAWINGS

FIG. 4 is a diagram illustrating example formats for a page header for a page used to store a list of closed pages, a section of the list, and a base allocation for a segment, according to some embodiments.

DETAILED DESCRIPTION

Figure 1A:
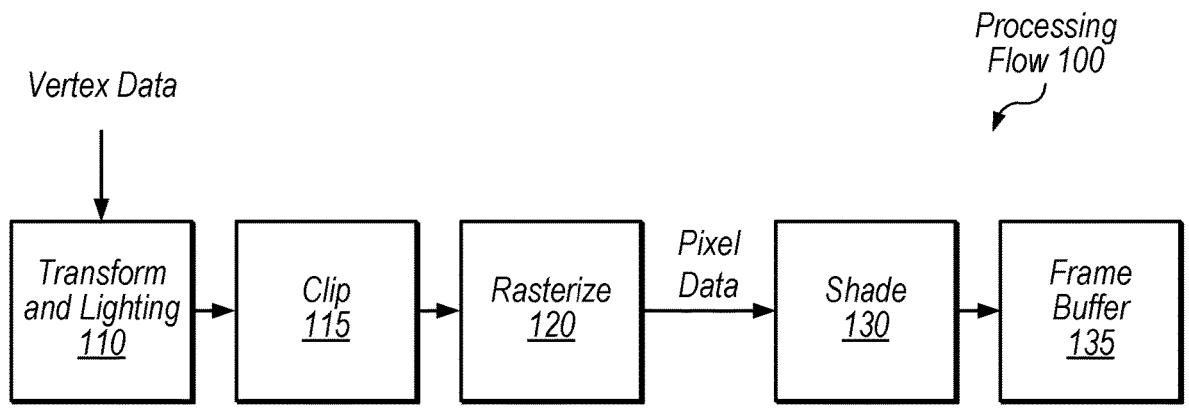
FIG. 1A is a diagram illustrating an overview of example graphics processing operations, according to some embodiments.

As discussed above, fragment generator circuitry may consume data generated by geometry processing. For example, a vertex data controller may launch geometry and tiling processor (GTP) sets of work (which may be referred to as "kicks") that include multiple segments. The GPU may execute these segments in a distributed fashion (e.g., partially in parallel on different hardware) to generate output data (e.g., primitive blocks and control streams).

In some embodiments, a graphics processor utilizes a unified memory architecture and allocates virtual memory pages to store outputs of GTP kicks (note that various disclosed embodiments may operate in a virtual address space, although disclosed techniques may be applied in other memory spaces in other embodiments). Detailed techniques for managing a page pool are discussed in detail below. In some embodiments, pages are also used to store a list of closed pages that have been completed by a given GTP segment. In some embodiments, the list of closed pages for a given segment may use multiple pages, which may be linked. In some embodiments, the segment lists of closed pages may be stitched together to form a consolidated list for a GTP kick. Fragment generator hardware may then traverse the consolidated list to access the primitive data and generate fragment data (e.g., for consumption by pixel/fragment shaders). Once consumed by the fragment generator circuitry, the closed pages may be deallocated back to a page pool.

In some embodiments, control circuitry may also cache memory pages, which may advantageously improve performance.

In various embodiments, disclosed techniques may facilitate distributed processing for geometry work and may substantially reduce memory footprint used by a list of closed pages, relative to traditional techniques.

As alluded to above, multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, a graphics driver maps a new kick to one of multiple kickslots. Each kickslot may include a set of configuration registers and may have a context ID that indicates a mapping between the kick's virtual addresses and physical addresses.

U.S. patent application Ser. No. 17/399,711 filed Aug. 11, 2021 is incorporated by reference herein in its entirety and discusses kickslot and logical kickslot techniques that may be used to track and distribute sets of processing work to distributed mGPUs. In some embodiments, similar techniques are utilized to distributed GTP kick segments to distributed geometry processor sub-units.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
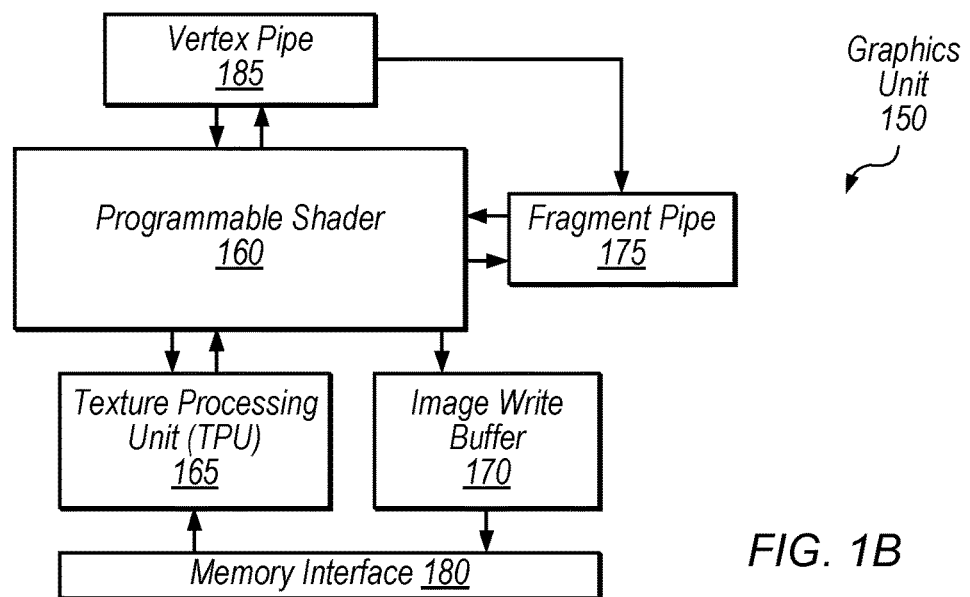
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Distributed Geometry Processing

Figure 2:
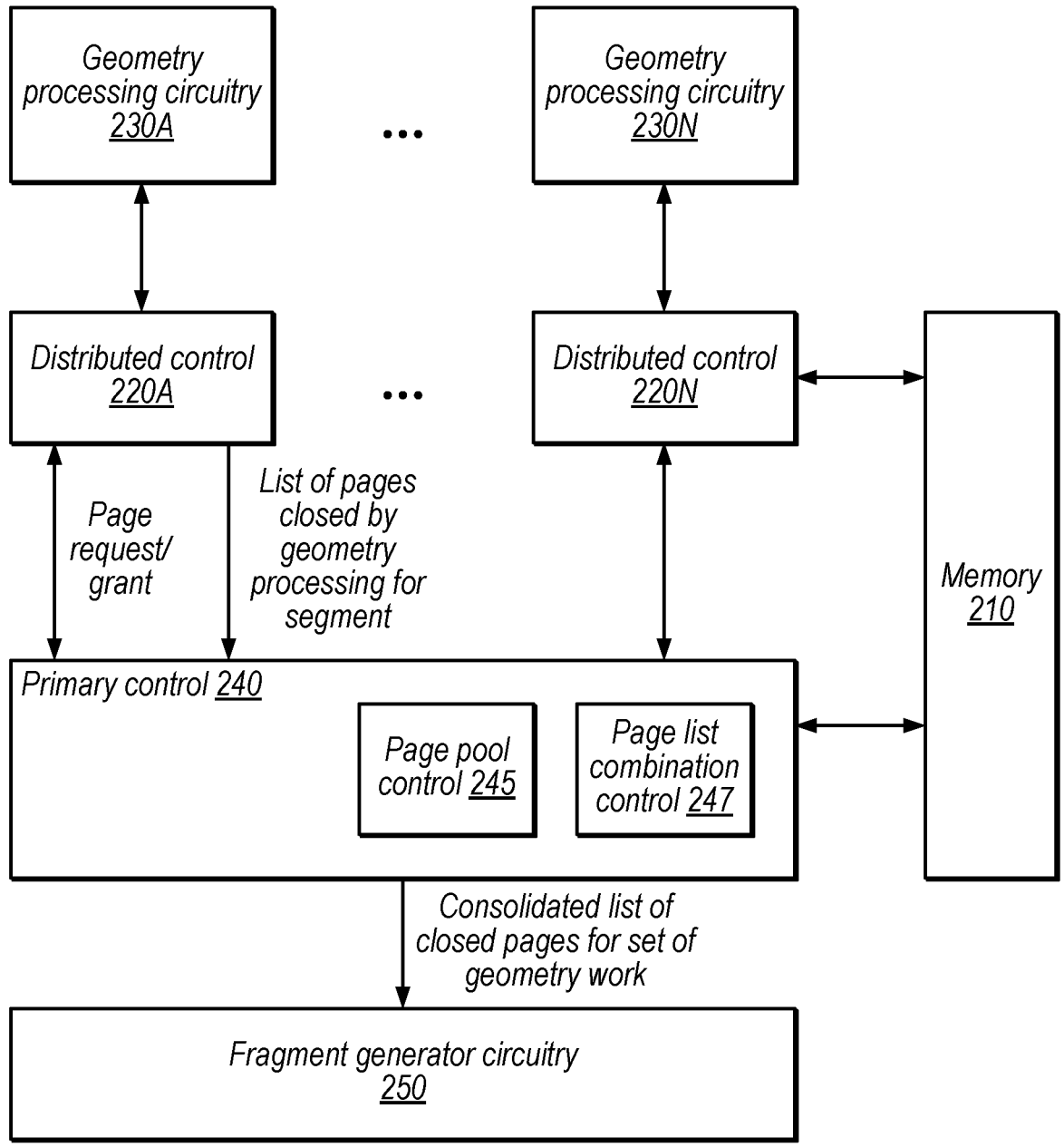
FIG. 2 is a block diagram illustrating example primary and distributed control circuitry for geometry processing, according to some embodiments.

FIG. 2 is block diagram illustrating example distributed and primary control circuitry, according to some embodiments. In the illustrated embodiment, a graphics processor includes memory 210, distributed control circuitry 220A-220N, geometry processing circuitry 230A-230N, primary control circuitry 240, and fragment generator circuitry 250.

Geometry processing circuitry 230, in some embodiments, is included in multiple GPU sub-units (which may be referred to as mGPUs). In some embodiments, control circuitry may distribute segments of a given GTP kick for processing by multiple different mGPUs. Geometry processing circuitry 230 may execute vertex shaders or may execute object shaders and mesh shaders, for example.

In some embodiments, a segment launched by vertex data control circuitry on an mGPU is assigned a segment ID in sequential fashion and this segment ID defines the age of the segment. Each of the segments may start, finish and in general work independently of each other. Additional kick segments may be launched as and when a GTP pipeline becomes available. This distributed processing of kick segments may advantageously improve performance relative to traditional geometry processing techniques, particularly for large kicks or when there are substantial dependencies between kicks.

Distributed control circuits 220, in some embodiments, are configured to interact with primary control circuitry 240 to procure pages from a page pool for geometry processing, e.g., via the illustrated page request/grant interface. In some embodiments, distributed control circuitry is implemented for each GTP pipeline (e.g., for each instance of geometry processing circuitry 230), one or more of which may be included on each mGPU. The distributed control circuits 220 may interact with geometry processing circuitry 230 to allocate pages for geometry processing output and close pages that are complete.

Distributed control circuitry 220 may also create and maintain a list of closed pages for a given segment being processed by its corresponding geometry processing circuitry 230. Distributed control circuits 220 may also procure pages from the page pool to store the list. In some embodiments, the list is a linked list, which may be referred to as a linked list of closed pages (LLCP). As shown, a given distributed control circuit 220 may provide its list of closed pages for a segment to primary control circuitry 240.

Primary control circuitry 240, in some embodiments, is configured to manage the page pool in memory 210, e.g., using page pool control circuitry 245, which may route requested pages to the appropriate distributed control circuit 220.

Page list combination control 247, in the illustrated embodiment, is configured to stitch the lists of closed pages for different segments of a given multi-segment GTP kick to generate a consolidated list of closed pages for the set of geometry work. It provides the consolidated list to fragment generator circuitry 250, which may traverse the list and deallocate pages as they are consumed. Note that the list may be stored in memory 210, a cache of primary control circuitry 240, or both. Therefore, primary control circuitry 240 may provide the list directly (e.g., from a cache) or indirectly (e.g., via memory 210) to fragment generator circuitry 250.

In some embodiments, combination control 247 is configured to stitch lists for up to N segments at a time, and these segments may be referred to as a stitch set. In some embodiments, combination control 247 maintains a segment-id-mask, a seg-start pointer, and a seg-end pointer. The segment-id-mask may track segments that have completed processing on geometry processing circuitry 230 and are ready for stitching. The seg-start pointer may point to the segment ID from which the next stitch operation should start and the seg-end pointer may refer to the last segment for the stitch set. In some embodiments, when a stitch operation is completed, combination control 247 communicates the seg-end pointer to the vertex data controller, e.g., so that it can re-use those segment ID's to launch new work. In some embodiments, a stitch set is not stitched until all of its segments are ready and the stitching circuitry does not move to the next stitch set until the current set is stitched.

Figure 3:
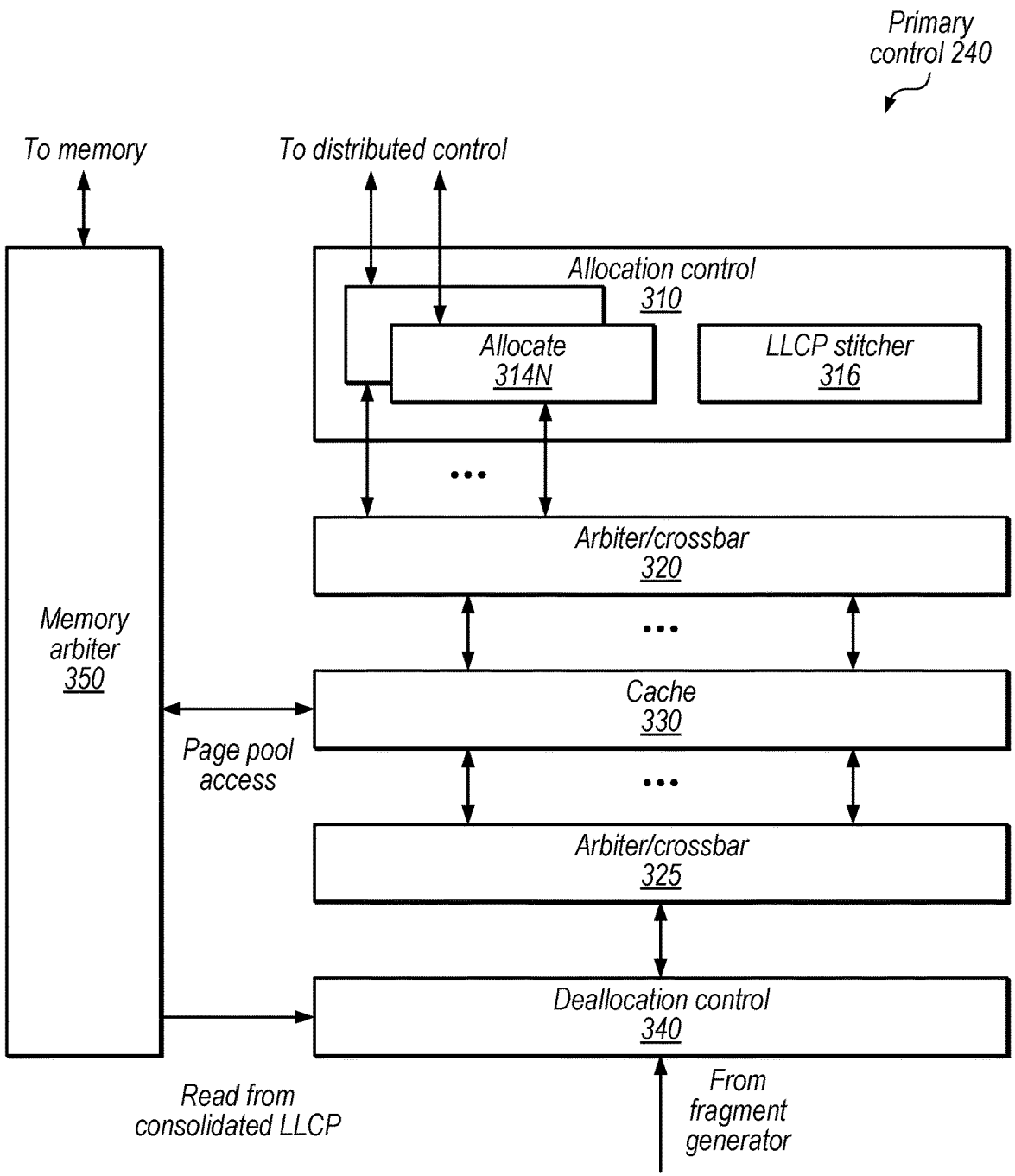
FIG. 3 is a block diagram illustrating a detailed example of primary control circuitry, according to some embodiments.

FIG. 3 is a block diagram illustrating an example implementation of primary control circuitry, according to some embodiments. In the illustrated embodiment, primary control circuitry 240 includes allocation control circuitry 310, arbiter/crossbar circuitry 320 and 325, cache 330, deallocation control circuitry 340, and memory arbiter circuitry 350.

In some embodiments, at the start of a GTP kick, primary control 240 connects cache 330 to the page pool assigned to the kick. Cache 330 may prefetch pages into an internal queue and allocate pages to the allocate circuits 314, e.g., using a pull model based on signaling from the distributed control circuits 220. Memory arbiter 350 may arbitrate among multiple memory access requests, including page pool access requests from cache 330 and LLCP read requests from deallocation control 340. The arbiter/crossbar circuit 320 may arbitrate when multiple distributed control circuits 220 request allocation and may route pages from different cache entries to the appropriate requester. In some embodiments, the arbiter uses a round-robin technique among requesters.

The allocate circuits 314 may include an instantiation per distributed control circuit 220 and may push requested pages from cache 330 into a credit FIFO (not explicitly shown) in a given corresponding distributed control circuit 220. The distributed control circuits 220 may then allocate pages in their credit FIFO to geometry processing circuitry when requested. Note that the pages in the credit FIFO may also be used by a distributed control circuit 220 to build the LLCP for a given segment. Pages that are procured by a distributed control circuit 220 but not allocated may eventually be deallocated back to the page pool when the segment completes.

If the page pool runs out of pages, primary control 240 may assert a signal (e.g., an interrupt to firmware) requesting growth of the page pool. In some circumstances, the firmware may not be able to grow the page pool, e.g., due to the operating system refusing a request for additional pages. In this situation, the processor may be configured to initiate a partial render to free closed pages so that geometry processing can continue. Detailed partial render techniques are discussed below with reference to FIG. 6.

Deallocation control circuitry 340, in the illustrated embodiment, is configured to handle page deallocation operations, e.g., based on information from the fragment generator indicating that the data from closed pages has been consumed. Deallocation control 340 may read from the consolidated LLCP to traverse and deallocate consumed pages.

Example Segment List Combining Techniques

FIG. 4 is a diagram illustrating example structures that may be used to track and stitch LLCPs, according to some embodiments.

The LLCP header, in some embodiments, is included in pages used to maintain an LLCP, e.g., at the beginning of the page. In the illustrated embodiment, the LLCP header includes an LLCP link field 410, a valid field 415, and a count of entries in page field 420. The LLCP link field 410 may indicate the next page used to store the LLCP. The valid field may indicate whether the LLCP link 410 is valid (e.g., it may be invalid if it is the last page in the LLCP). The count field 420 indicates the number of entries on the page (which may be in granularity of pages, sections, etc.).

A given LLCP section, in the illustrated embodiment, includes valid field 425 which indicates the validity of one or more pages indicated by the section and page identifier(s) 430 that identify closed pages. A given section may include identifiers for multiple pages. A given page of the LLCP may include up to N sections, along with the header, which may vary based on the page size and section size.

The LLCP segment base allocation includes information for a given segment LLCP. In the illustrated embodiment, the base allocation includes a valid field 435, an LLCP last-linked-count 440, an LLCP last-linked-page 445, a valid field 450, and an LLCP first-linked-age field 455.

Valid field 435, in some embodiments, indicates whether fields 440 and 445 are valid while valid field 450 may indicate whether field 455 is valid.

The LLCP last-linked count 440, in some embodiments, indicates the count of LLCP sections in the last page in a segment LLCP. The LLCP last-linked page 445, in some embodiments, indicates the last page for a segment LLCP. In some embodiments, these fields may facilitate deallocation, e.g., by avoiding a need to traverse the pages of the segment LLCP or examine page contents to detect the last section on an LLCP page. This information may also be useful when returning after a context switch, to allow rapid resumption of writing to the end of the segment LLCP.

The LLCP first-linked page 455, in some embodiments, indicates the first page used for the segment LLCP. This may facilitate stitching, e.g., the previous segment may update the header LLCP link field 410 of its last page to point to the first-linked page indicated by field 455.

Figure 5:
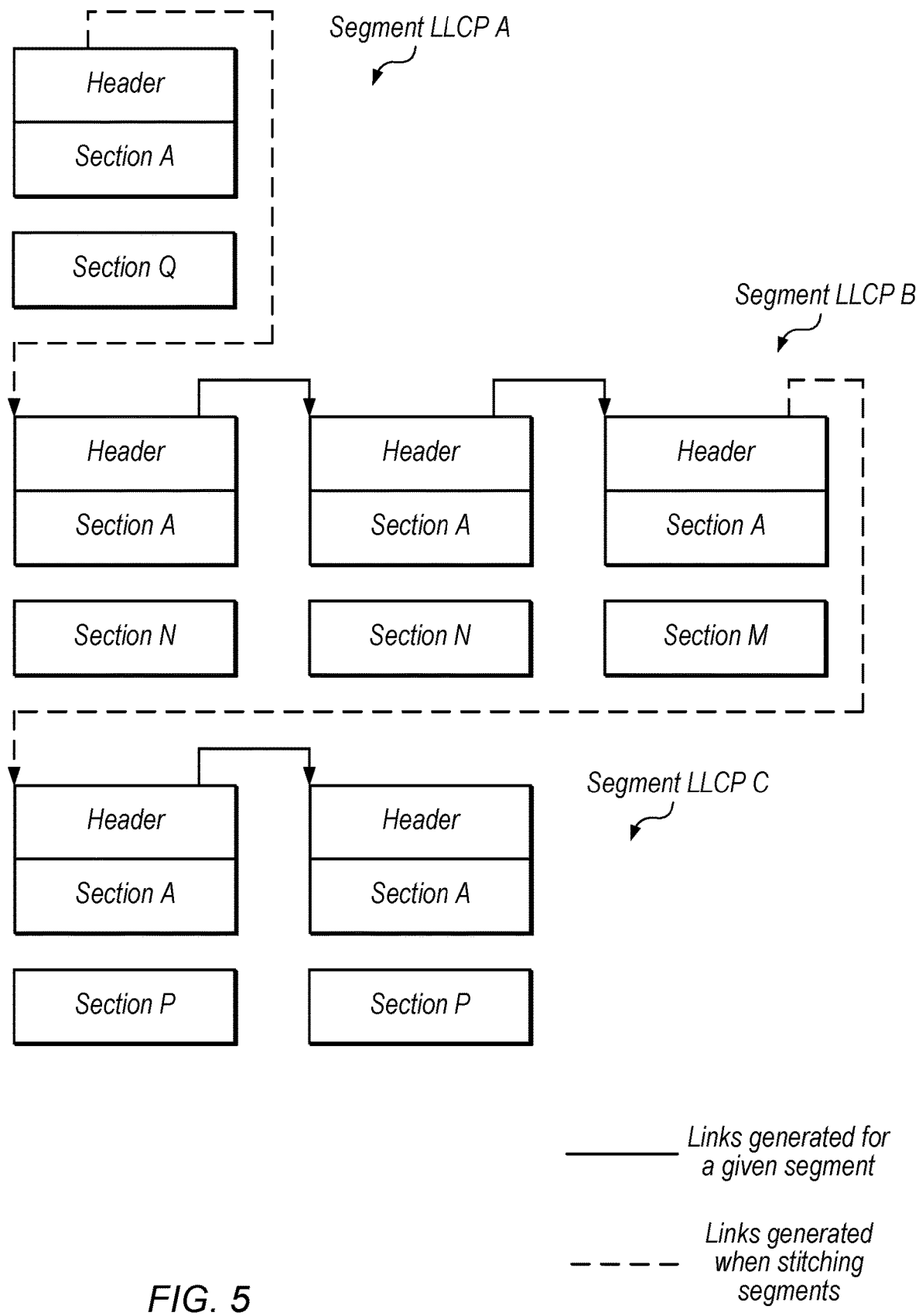
FIG. 5 is a diagram illustrating example stitching of lists of closed pages for multiple segments, according to some embodiments.

FIG. 5 is a diagram illustrating example stitching of three segment LLCPs, according to some embodiments. In the illustrated embodiment, segment LLCP A includes a single page with Q sections, segment LLCP B includes two pages with N sections and a page with M sections, and segment LLCP C includes two pages with P sections. In some embodiments, the number of sections per full page may be the same but the last page of a list may include a different number of sections if it is not full.

In the illustrated example, solid arrows represent links generated by distributed control circuitry 220 for a given segment LLCP while the dashed arrows represent links generated by primary control circuitry 240 when stitching segment lists together. For example, to stitch segment LLCP's A and B, primary control circuitry 240 may update the header of the page of segment LLCP A to indicate that the link is valid and update the link to indicate the first page of segment LLCP B.

Disclosed techniques may advantageously allow the LLCP for a kick to grow dynamically, with segment LLCP's of various sizes and a compact representation when LLCP's are stitched. This may substantially reduce memory requirements and improve flexibility, e.g., relative to maintaining a single list of potentially unbounded size.

Example Partial Render Techniques

In some situations, a page pool may be unable to provide sufficient pages for a GTP kick. For example, firmware may request a page pool grow operation and an operating system may refuse the request. In this situation, the graphics processor may initiate a partial render of the segmented kick, e.g., to consume at least some of its completed outputs and free pages for further processing. Partial renders may need to be performed in age order and, in some embodiments, may only free up pages that have been closed and added to an LLCP. In embodiments where each GTP pipe is able to hold on to N pages without closing them, the primary control circuitry 240 may guarantee that the oldest segment has received at least N+1 number of pages before the page pool runs out of pages. In these embodiments, the arbiter 320 between an allocate circuit 314 and the cache 330 may lock and only grant the oldest segment once the number of pages in the page pool goes below N.

Figure 6:
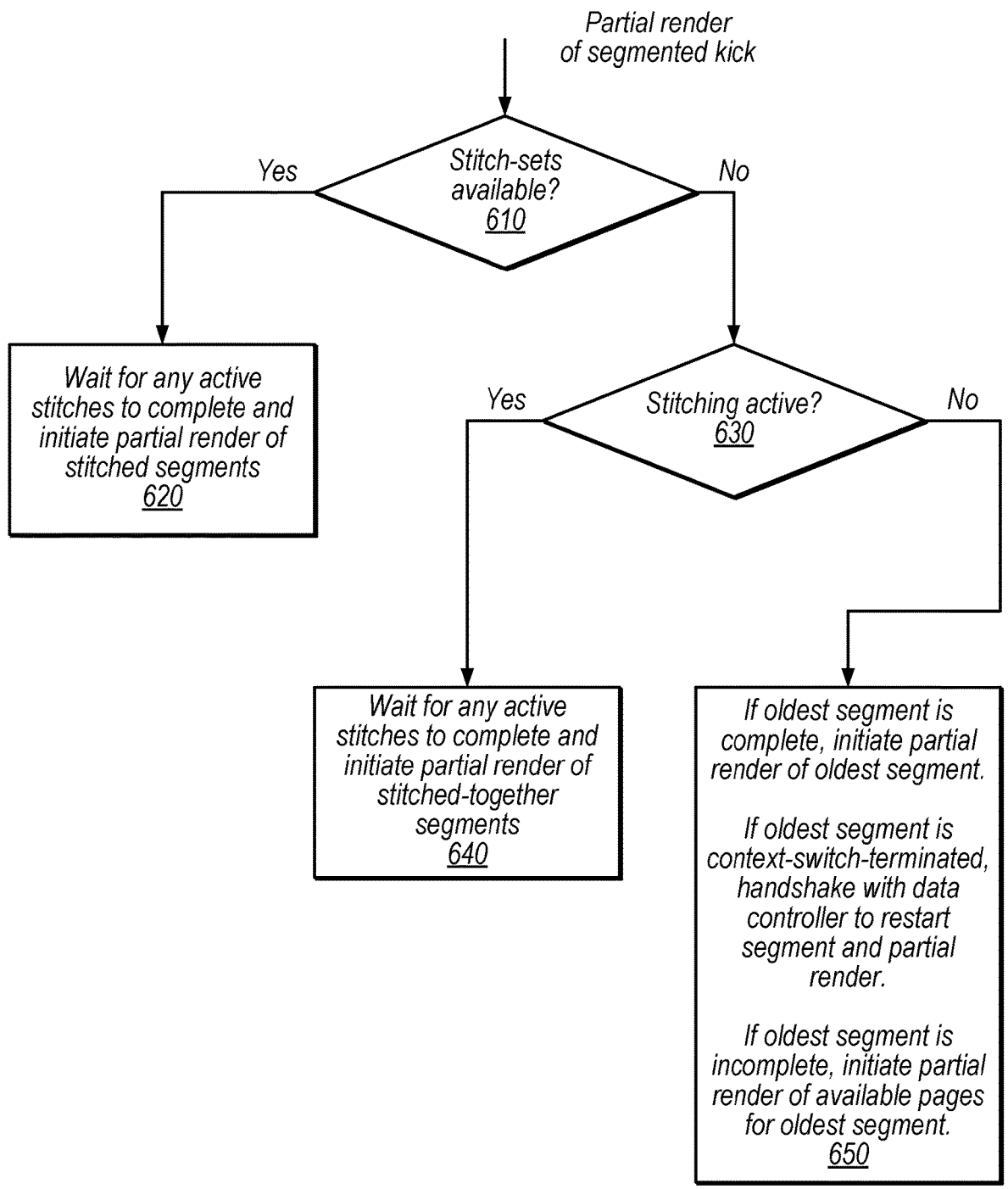
FIG. 6 is a flow diagram illustrating example techniques for partial renders of a segmented kick.

FIG. 6 is a flow diagram illustrating an example partial render technique, according to some embodiments. In the illustrated embodiment, the method starts when a partial render of a segmented kick is initiated.

At 610, in the illustrated embodiment, control circuitry determines if any stitch sets are available (e.g., whether any segment LLCPs have already been stitched). If so, flow proceeds to 620 and the control circuitry waits for any active stitches to complete and then initiates a partial render of the stitched segments.

If no stitch-sets are available at 610, flow proceeds to 630 and the control circuitry determines whether a stitching operation is in progress. If so, flow proceeds to 640 and the control circuitry waits for any active stitches to complete, then initiates a partial render of the stitched segments from the active stitching.

If stitching is not active at 630, in the illustrated example, flow proceeds to 650. At 650, if the oldest segment is complete, the control circuitry initiates partial render of the oldest segment. If the oldest segment is context-switch-terminated, the control circuitry handshakes with the vertex data controller to restart the segment and initiates a partial render. If the oldest segment is incomplete, the control circuitry initiates a partial render using available LLCP pages for the oldest segment.

Disclosed techniques may ensure not to skip unprocessed geometry. In some embodiments, primary control circuitry 240 is configured to signal an out-of-memory condition to firmware in response to an oldest non-complete segment running out of memory (the out-of-memory status of younger segments may not be considered, in this example). In some embodiments, on resume, the geometry processing circuitry 230 that was earliest-assigned may start first, e.g., to avoid page starvation.

Disclosed partial render techniques may advantageously allow work to proceed to free up pages in low memory situations while maintaining ordering of segments.

Example Method

Figure 7:
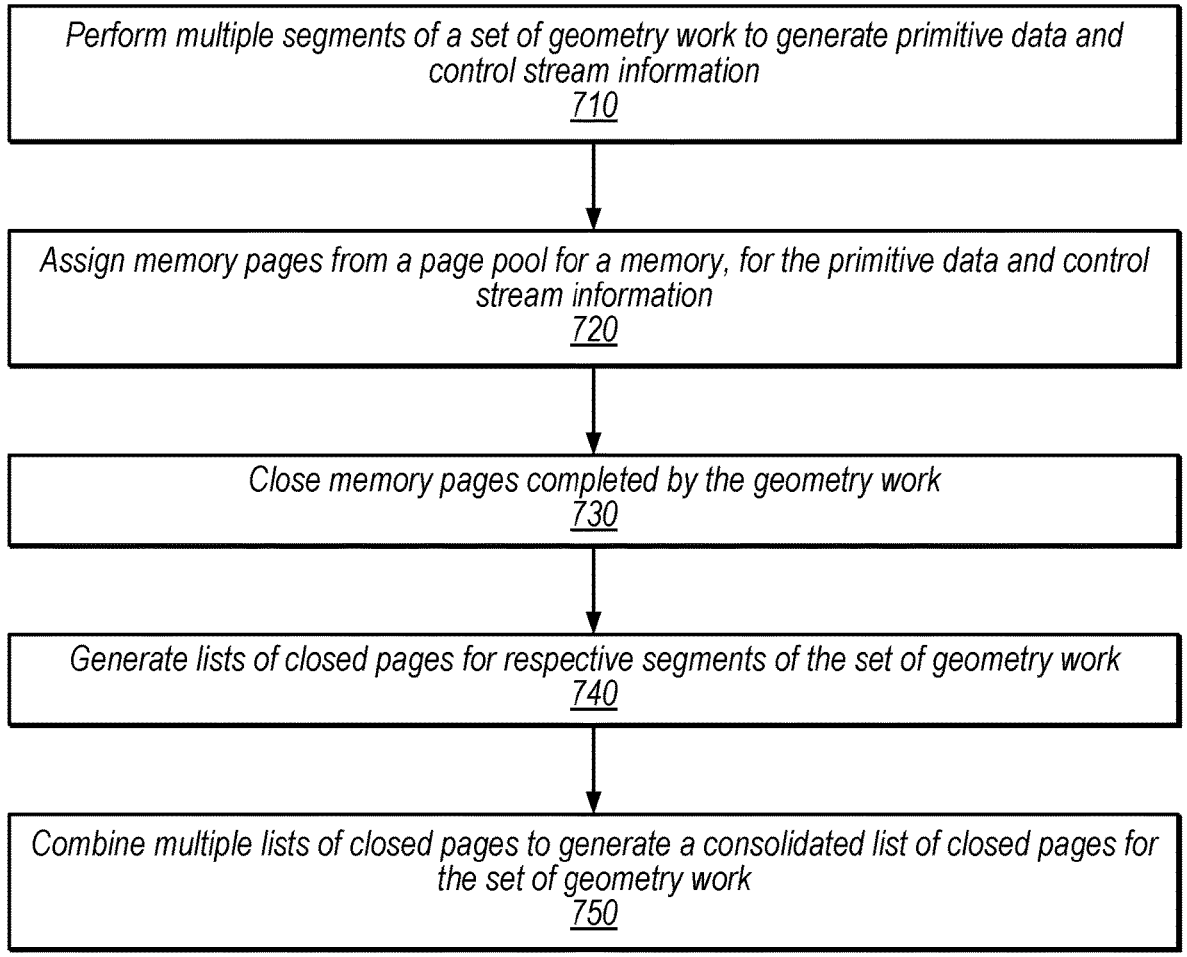
FIG. 7 is a flow diagram illustrating an example method for combining lists of closed pages for different segments, according to some embodiments.

FIG. 7 is a flow diagram illustrating an example method for generating and stitching lists of closed pages, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a graphics processor (e.g., geometry processing circuitry 230) performs multiple segments of a set of geometry work to generate primitive data (and control stream information, in some embodiments).

At 720, in the illustrated embodiment, the graphics processor (e.g., primary control 240) assigns memory pages from a page pool for a memory, for the primitive data and control stream information. In some embodiments, control circuitry includes a cache configured to cache ones or more pages of the page pool. In some embodiments, arbitration circuitry arbitrates among multiple distributed control circuits for access to the cache.

At 730, in the illustrated embodiment, the graphics processor (e.g., distributed control 220) closes memory pages completed by the geometry work. This may include determining that the pages are full or that a corresponding set of work is complete and marking the pages as closed.

At 740, in the illustrated embodiment, the graphics processor (e.g., distributed control 220) generates lists of closed pages for respective segments of the set of geometry work.

At 750, in the illustrated embodiment, the graphics processor (e.g., primary control 240) combines multiple lists of closed pages to generate a consolidated list of closed pages for the set of geometry work. In some embodiments, to combine multiple lists of closed pages, the primary control circuitry is configured to update link information in a header of a page of a first list of closed pages to indicate a page of a second list of closed pages. In some embodiments, at least one of the multiple lists of closed pages is stored using multiple pages linked via headers (e.g., LLCP's B and C of FIG. 5).

In some embodiments, the lists of closed pages for different segments and the consolidated list of closed pages are linked lists.

In some embodiments, the primary control circuitry is configured to combine the multiple lists of closed pages based on allocation information for one or more segments. The allocation information for a given segment may indicate: validity information (e.g., fields 435 and 450) a last-linked page for the segment (e.g., field 445), a count of entries on the last-linked page for the segment (e.g., field 440), and a first-linked page for the segment (e.g., field 455).

In some embodiments, deallocation circuitry, in response to completion signaling from fragment processing circuitry of the graphics processor circuitry, traverses the consolidated list of closed pages and deallocates: closed pages listed in the consolidated list of closed pages and pages used to store the consolidated list of closed pages. The fragment generator circuitry may include rasterization circuitry.

In some embodiments, the processor is configured to, in response to signaling indicating low memory availability, take various actions based on current operation conditions. For example, in response to a determination that a partial consolidated list of closed pages has been generated by combining lists of closed pages for multiple segments, the processor may initiate a partial render using the partial consolidated list of closed pages. As another example, in response to a determination that no partial consolidated list has been generated for the multiple segments, the processor may initiate a partial render using a list of closed pages for an oldest segment.

Example Device

Figure 8:
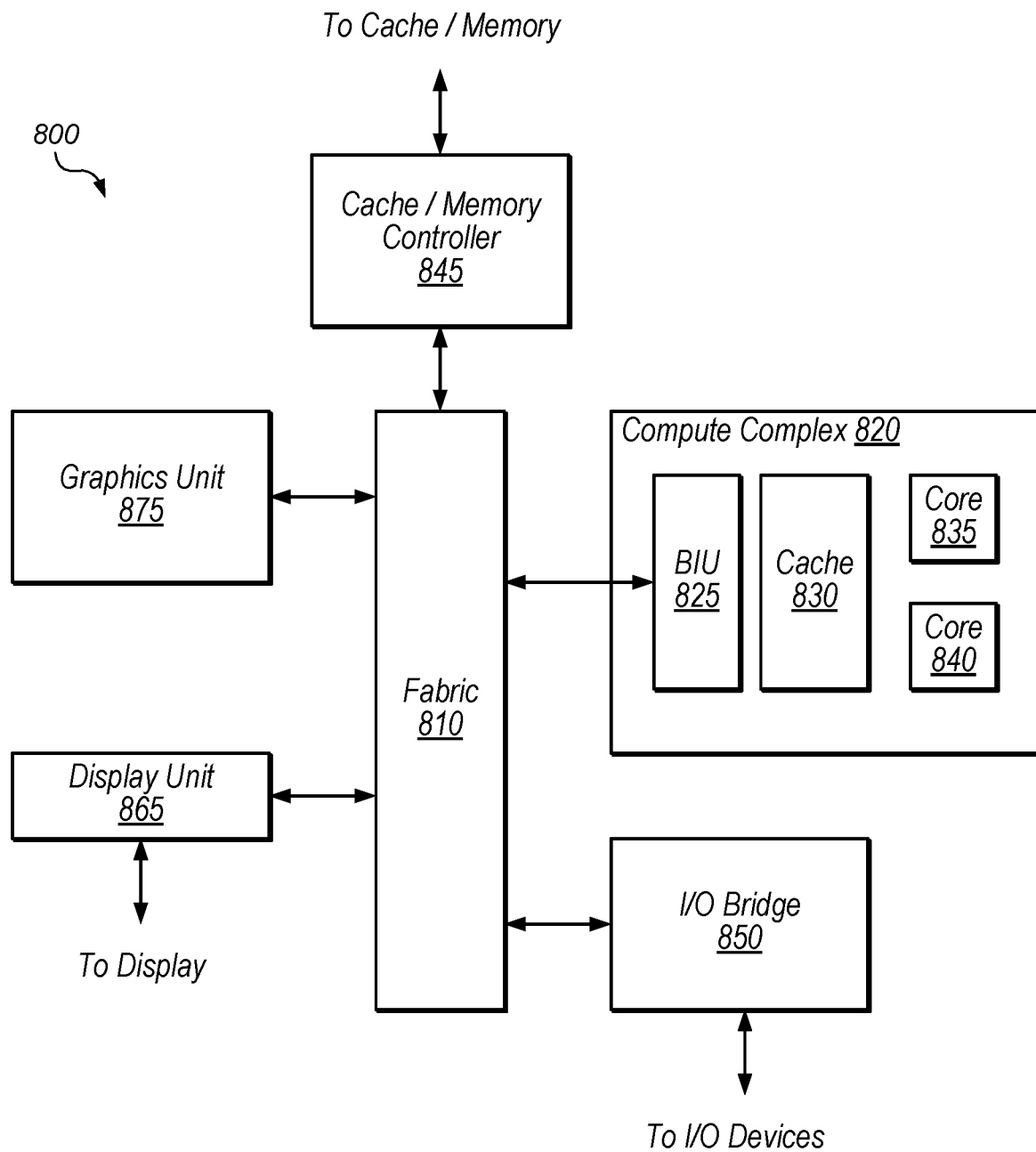
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may advantageously improve the performance of graphics unit 857, e.g., by reducing the memory footprint needed for certain geometry workloads, facilitating partial renders in certain scenarios, etc.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Figure 9:
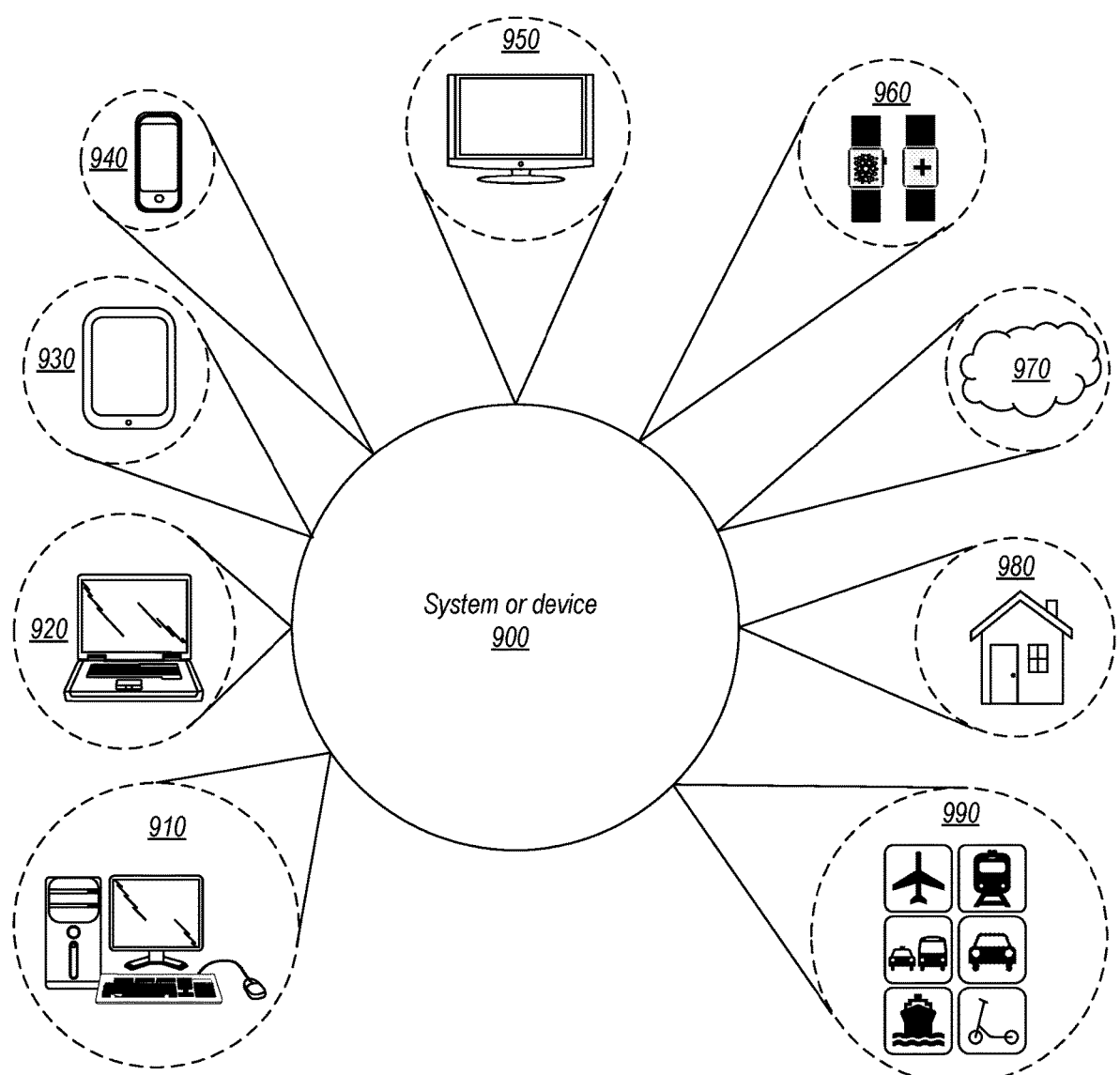
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
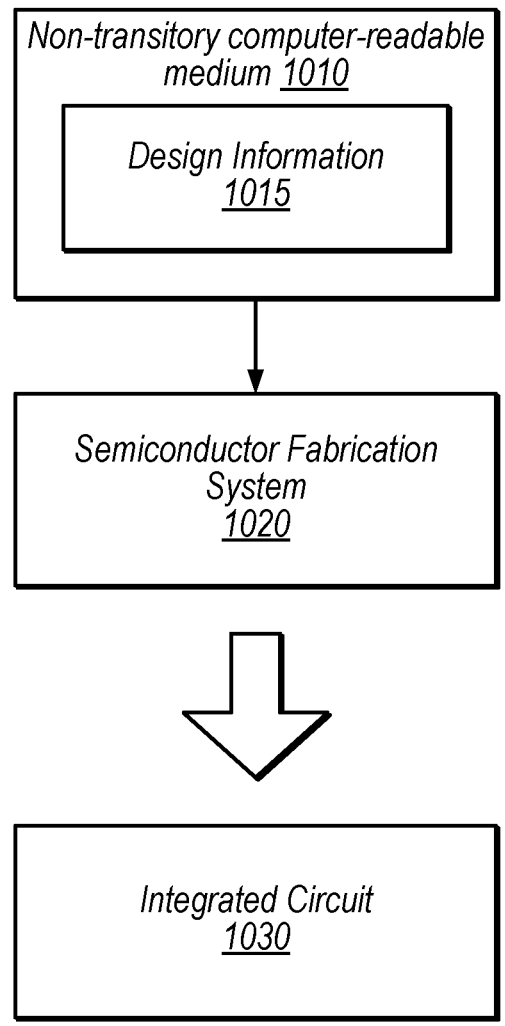
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1B, 2-3, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   graphics processor circuitry configured to:
      perform geometry work that generates primitive data, wherein the graphics processor circuitry is configured to independently process multiple segments of a set of geometry work; and
      perform fragment generator work that consumes the generated primitive data and generates fragment data,
   distributed control circuitry configured to:
      assign memory pages, from a page pool for a memory, for primitive data from the geometry work;
      indicate as complete, based on interaction with the graphics processor circuitry, memory pages that are full of data from the geometry work; and
      generate a list of completed pages for a given segment of the set of geometry work;
   primary control circuitry configured to:
      control the page pool; and
      combine multiple lists of completed pages, from the distributed control circuitry, to generate a consolidated list of completed pages for the set of geometry work for consumption by the fragment generator work.

2. The apparatus of claim 1, wherein, to combine multiple lists of completed pages, the primary control circuitry is configured to update link information in a header of a page of a first list of completed pages to indicate a page of a second list of completed pages.

3. The apparatus of claim 2, wherein at least one of the multiple lists of completed pages is stored using multiple pages linked via headers.

4. The apparatus of claim 1, wherein the lists of completed pages for different segments and the consolidated list of completed pages are linked lists.

5. The apparatus of claim 1, wherein the primary control circuitry is configured to combine the multiple lists of completed pages based on allocation information for one or more segments, wherein the allocation information for a given segment that indicates:
   validity information;
   a last-linked page for the segment;
   a count of entries on the last-linked page for the segment; and
   a first-linked page for the segment.

6. The apparatus of claim 1, wherein the primary control circuitry includes a cache configured to cache ones of more pages of the page pool.

7. The apparatus of claim 6, wherein the primary control circuitry includes arbitration circuitry configured to arbitrate among multiple distributed control circuits for access to the cache.

8. The apparatus of claim 1, wherein the primary control circuitry includes deallocation circuitry configured to, in response to completion signaling from fragment processing circuitry of the graphics processor circuitry, traverse the consolidated list of completed pages and deallocate:
   completed pages listed in the consolidated list of completed pages; and
   pages used to store the consolidated list of completed pages.

9. The apparatus of claim 1, wherein control circuitry of the apparatus is configured to, in response to signaling indicating low memory availability:
   in response to a determination that a partial consolidated list of completed pages has been generated by combining lists of completed pages for multiple segments, initiate a partial render using the partial consolidated list of completed pages; and
   in response to a determination that no partial consolidated list has been generated for the multiple segments, initiate a partial render using a list of completed pages for an oldest segment.

10. The apparatus of claim 1, wherein the apparatus is a computing device that further comprises:
    a central processing unit;
    network interface circuitry; and
    a display.

11. The apparatus of claim 1, wherein the distributed control circuitry is also configured to indicate a memory page that is not full of data as complete, in response to completion of the set of geometry work.

12. A method, comprising:
    performing, by a graphics processor, multiple segments of a set of geometry work to generate primitive data;
    assigning, by the graphics processor, memory pages from a page pool for a memory, for the primitive data;
    marking as complete, by the graphics processor, memory pages that are full of data from the geometry work;
    generating, by the graphics processor, lists of completed pages for respective segments of the set of geometry work; and
    combining, by the graphics processor, multiple lists of completed pages to generate a consolidated list of completed pages for the set of geometry work.

13. The method of claim 12, wherein at least two of the segments are processed by different distributed portions of the graphics processor.

14. The method of claim 12, wherein the combining includes updating link information in a header of a page of a first list of completed pages to indicate a page of a second list of completed pages.

15. The method of claim 12, further comprising:
    in response to completion signaling indicating that the completed pages have been consumed by one or more fragment processing tasks, the graphics processor traversing the consolidated list of completed pages to deallocate:
    completed pages listed in the consolidated list of completed pages; and
    pages used to store the consolidated list of completed pages.

16. The method of claim 12, further comprising:
    in response to determining that a partial consolidated list of completed pages has been generated by combining lists of completed pages for multiple segments, the graphics processor initiating a partial render using the partial consolidated list of completed pages.

17. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
graphics processor circuitry configured to:
perform geometry work that generates primitive data, wherein the graphics processor circuitry is configured to independently process multiple segments of a set of geometry work; and
perform fragment generator work that consumes the primitive data and generates fragment data,
distributed control circuitry configured to:
assign memory pages, from a page pool for a memory, for primitive data from the geometry work;
indicate as complete, based on interaction with the graphics processor circuitry, memory pages that are full of data from the geometry work; and
generate a list of completed pages for a given segment of the set of geometry work;
primary control circuitry configured to:
control the page pool; and
combine multiple lists of completed pages, from the distributed control circuitry, to generate a consolidated list of completed pages for the set of geometry work for consumption by the fragment generator work.

18. The non-transitory computer readable storage medium of claim 17, wherein, to combine multiple lists of completed pages, the primary control circuitry is configured to update link information in a header of a page of a first list of completed pages to indicate a page of a second list of completed pages.

19. The non-transitory computer readable storage medium of claim 17, wherein the primary control circuitry is configured to combine the multiple lists of completed pages based on allocation information for one or more segments, wherein the allocation information for a given segment that indicates:
validity information;
a last-linked page for the segment;
a count of entries on the last-linked page for the segment; and
a first-linked page for the segment.

20. The non-transitory computer readable storage medium of claim 17, wherein the primary control circuitry includes a cache configured to cache ones of more pages of the page pool and the primary control circuitry includes arbitration circuitry configured to arbitrate among multiple distributed control circuits for access to the cache.

* * * * *